US011388638B2

(12) United States Patent
Yeh et al.

(10) Patent No.: US 11,388,638 B2
(45) Date of Patent: *Jul. 12, 2022

(54) SIGNALING DESIGN OF ENHANCED HANDOVER SUPPORT FOR DRONES IN A CELLULAR NETWORK

(71) Applicant: Intel Corporation, Santa Clara, CA (US)

(72) Inventors: Shu-ping Yeh, Campbell, CA (US); Jingwen Bai, San Jose, CA (US); Feng Xue, Redwood City, CA (US); Candy Yiu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 674 days.

This patent is subject to a terminal disclaimer.

(21) Appl. No.: 16/406,781

(22) Filed: May 8, 2019

(65) Prior Publication Data

US 2019/0364472 A1 Nov. 28, 2019

Related U.S. Application Data

(63) Continuation of application No. 16/274,865, filed on Feb. 13, 2019, now Pat. No. 10,772,018.

(Continued)

(51) Int. Cl.
| | |
|---|---|
| *H04W 36/08* | (2009.01) |
| *H04W 36/24* | (2009.01) |
| *H04W 76/27* | (2018.01) |
| *H04W 24/10* | (2009.01) |
| *H04W 36/32* | (2009.01) |
| *H04W 36/30* | (2009.01) |

(Continued)

(52) U.S. Cl.
CPC .......... *H04W 36/08* (2013.01); *H04L 43/062* (2013.01); *H04L 43/16* (2013.01); *H04W 24/10* (2013.01); *H04W 36/24* (2013.01); *H04W 36/30* (2013.01); *H04W 36/32* (2013.01); *H04W 76/27* (2018.02)

(58) Field of Classification Search
CPC ..... H04W 36/08; H04W 76/27; H04W 24/10; H04W 36/24; H04W 36/30; H04W 36/32; H04L 43/062; H04L 43/16
See application file for complete search history.

(56) References Cited

U.S. PATENT DOCUMENTS

2020/0245174 A1\* 7/2020 Lu ........................ H04W 24/10

\* cited by examiner

*Primary Examiner* — Ronald B Abelson
(74) *Attorney, Agent, or Firm* — Schwegman Lundberg & Woessner, P.A.

(57) ABSTRACT

To configure a UT for handover between a source evolved Node-B (eNB) and a target eNB using aerial communications in a cellular network, the UE processing circuitry is to decode measurement configuration information from the source eNB. The measurement configuration information includes a plurality of height thresholds associated with aerial height of the UE. A measurement report is encoded for transmission to the source eNB. The measurement report includes the aerial height of the UE and the measurement report generation triggered based on one or more triggering events associated with the plurality of height thresholds. RRC signaling from the source eNB is decoded, the RRC signaling including a handover command. The handover command is based on a handover decision by the source eNB using the measurement report. A handover from the source eNB to the target eNB is performed based on the handover command.

20 Claims, 8 Drawing Sheets

Related U.S. Application Data

(60) Provisional application No. 62/631,325, filed on Feb. 15, 2018.

(51) Int. Cl.
    *H04L 43/16*     (2022.01)
    *H04L 43/062*     (2022.01)

SIGNALING DESIGN OF ENHANCED HANDOVER SUPPORT FOR DRONES IN A CELLULAR NETWORK

PRIORITY CLAIM

This application is a continuation of U.S. patent application Ser. No. 16/274,865, filed Feb. 13, 2019, which claims the benefit of priority to the U.S. Provisional Patent Application Ser. No. 62/631,325, filed Feb. 15, 2018, and entitled "METHOD AND SIGNALING DESIGN OF ENHANCED HANDOVER SUPPORT FOR DRONES IN A CELLULAR NETWORK," which patent applications are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for signaling design of enhanced handover support for aerial user equipment (UE), such as a drone US, in a cellular network.

BACKGROUND

Mobile communications have evolved significantly from early voice systems to today's highly sophisticated integrated communication platform. With the increase in different types of devices communicating with various network devices, the usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to address the signaling design of enhanced handover support for aerial UEs, such as drones, in a cellular network.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
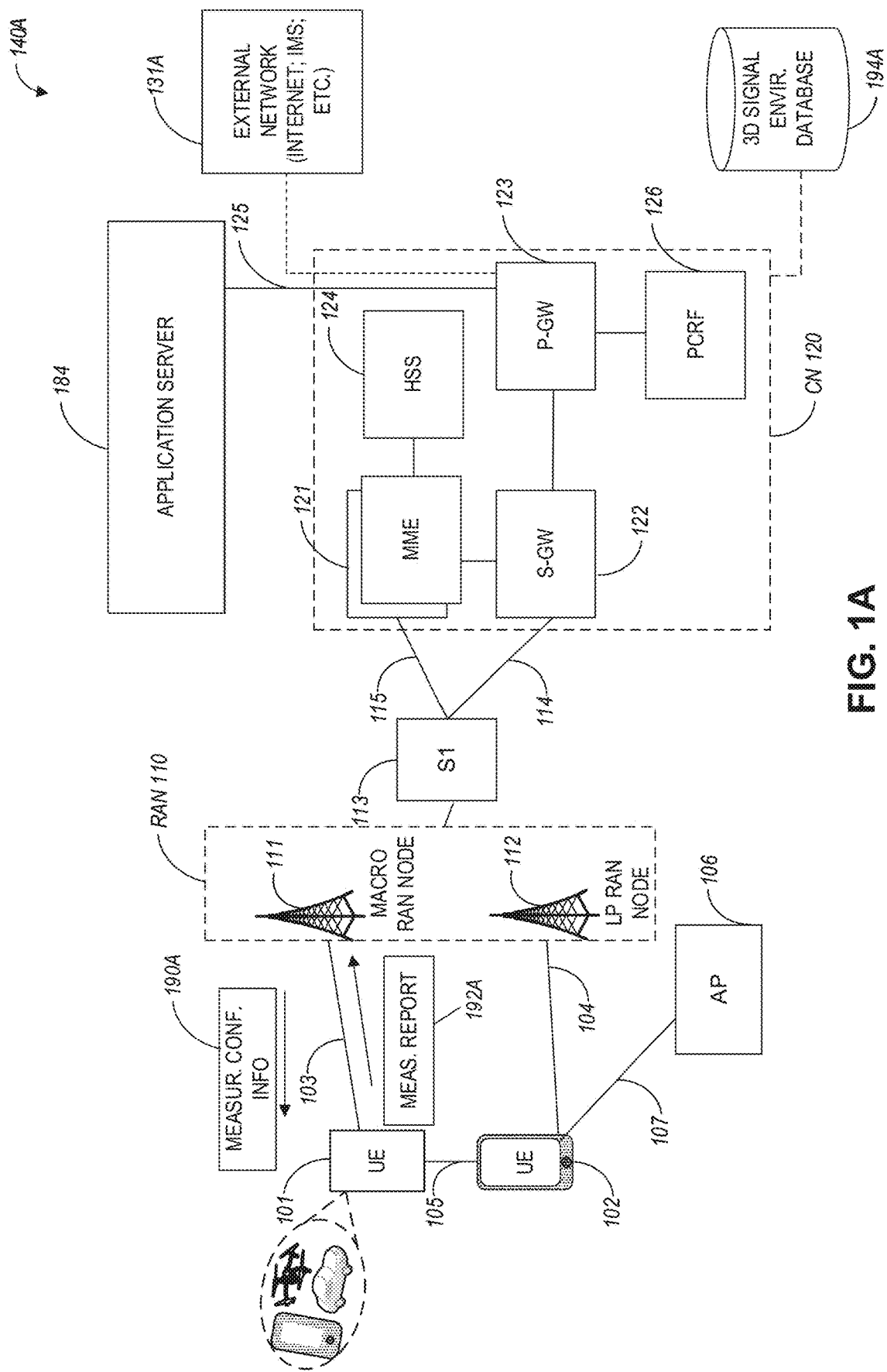
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on the unlicensed spectrum via CA, while Rel-14 enhanced LAA (eLAA) system focuses on the design of uplink operation on the unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, and FIG. 1D.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSDCH), a Physical Sidelink Discovery Channel (PSDCH), and a Physical Sidelink Broadcast Channel (PSDCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can support connectivity to a 5G core network (5GCN) and can be configured to operate with Early Data Transmission (EDT) in a communication architecture that supports one or more of Machine Type Communications (MTC), enhanced MTC (eMTC), further enhanced MTC (feMTC), even further enhanced MTC (efeMTC), and narrowband Internet-of-Things (NB-IoT) communications. When operating with EDT, a physical random access channel (PRACH) procedure message 3 (MSG3) can be used to carry the short uplink (UL) data and PRACH procedure message 4 (MSG4) can be used to carry short downlink (DL) data (if any is available). When a UE wants to make a new RRC connection, it first transmits one or more preambles, which can be referred to as PRACH procedure message 1 (MSG1). The MSG4 can also indicate UE to immediately go to IDLE mode. For this purpose, the transport block size (TBS) scheduled by the UL grant received for the MSG3 to transmit UL data for EDT needs to be larger than the TBS scheduled by the legacy grant. In some aspects, the UE can indicate its intention of using the early data transmission via MSG1 using a separate PRACH resource partition. From MSG1, eNB knows that it has to provide a grant scheduling TBS values that may differ from legacy TBS for MSG3 in the random-access response (RAR or MSG2) so that the UE can transmit UL data in MSG3 for EDT. However, the eNB may not exactly know what would be the size of UL data the UE wants to transmit for EDT and how large a UL grant for MSG3 would be needed, though a minimum and a maximum TBS for the UL grant could be defined. The following two scenarios may occur: (a) The UL grant provided in RAR is larger than the UL data plus header. In this case, layer 1 needs to add one or more padding bits in the remaining grant. However, transmitting a large number of padding bits (or useless bits) is not power efficient especially in deep coverage where a larger number of repetitions of transmission is required. (b) Similarly, when the UL grant provided in RAR is large but falls short to accommodate the UL data for the EDT, the UE may have to send only the legacy RRC message to fallback to legacy RRC connection. In this case, UE may again need to transmit a number of padding bits, which can be inefficient.

As used herein, the term "PRACH procedure" can be used interchangeably with the term "Random Access procedure" or "RA procedure".

In some aspects and as described hereinbelow, the UE 101 (and 102) can be configured for aerial communications in a cellular network. In this regard, UE 101 can be implemented within a vehicle or it can be a drone. In some aspects, techniques disclosed herein can be used for enhanced handover support when the UE 101 is configured for aerial communications (e.g., when the UE 101 is a drone) in a cellular network. More specifically, UE 101 can be configured for measurement reporting using measurement configuration information 190A received from eNB 111. In response, UE 101 can perform measurement reporting and generate a measurement report 192A for communication to the eNB 111. The measurement report 192A can include signaling, as discussed hereinbelow, which can be used for enhanced handover support. Additionally, core network 120 can include a database 194A with 3D signal environment properties which can be used for enhanced handover support as discussed herein.

Figure 1B:
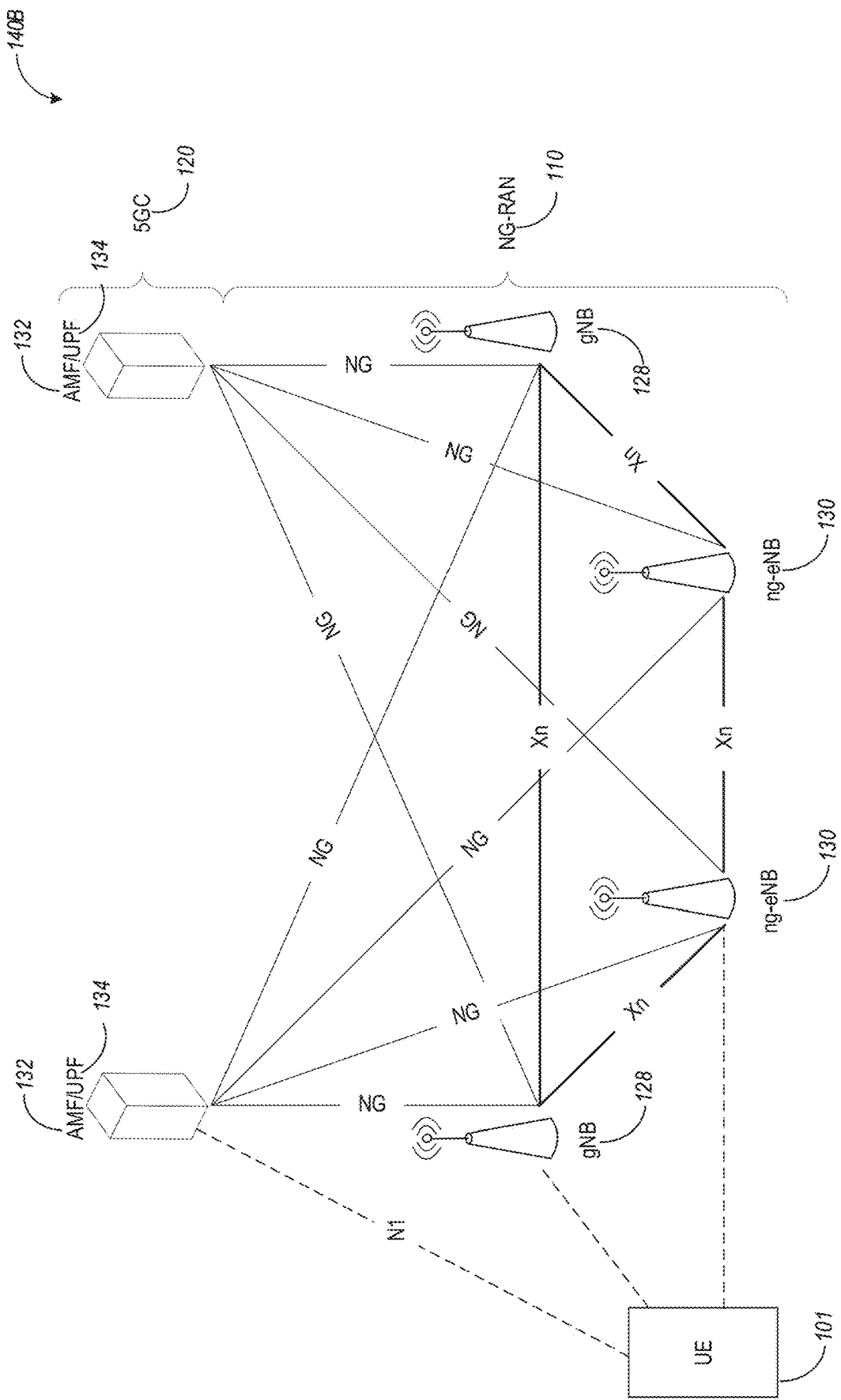
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, the NG system architecture 140B can use reference points between various nodes as provided by 3GPP Technical Specification (TS) 23.501 (e.g., V15.4.0, 2018-12).

In some aspects, each of the gNBs 128 and the NG-eNBs 130 can be implemented as a base station, a mobile edge server, a small cell, a home eNB, and so forth.

In some aspects, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
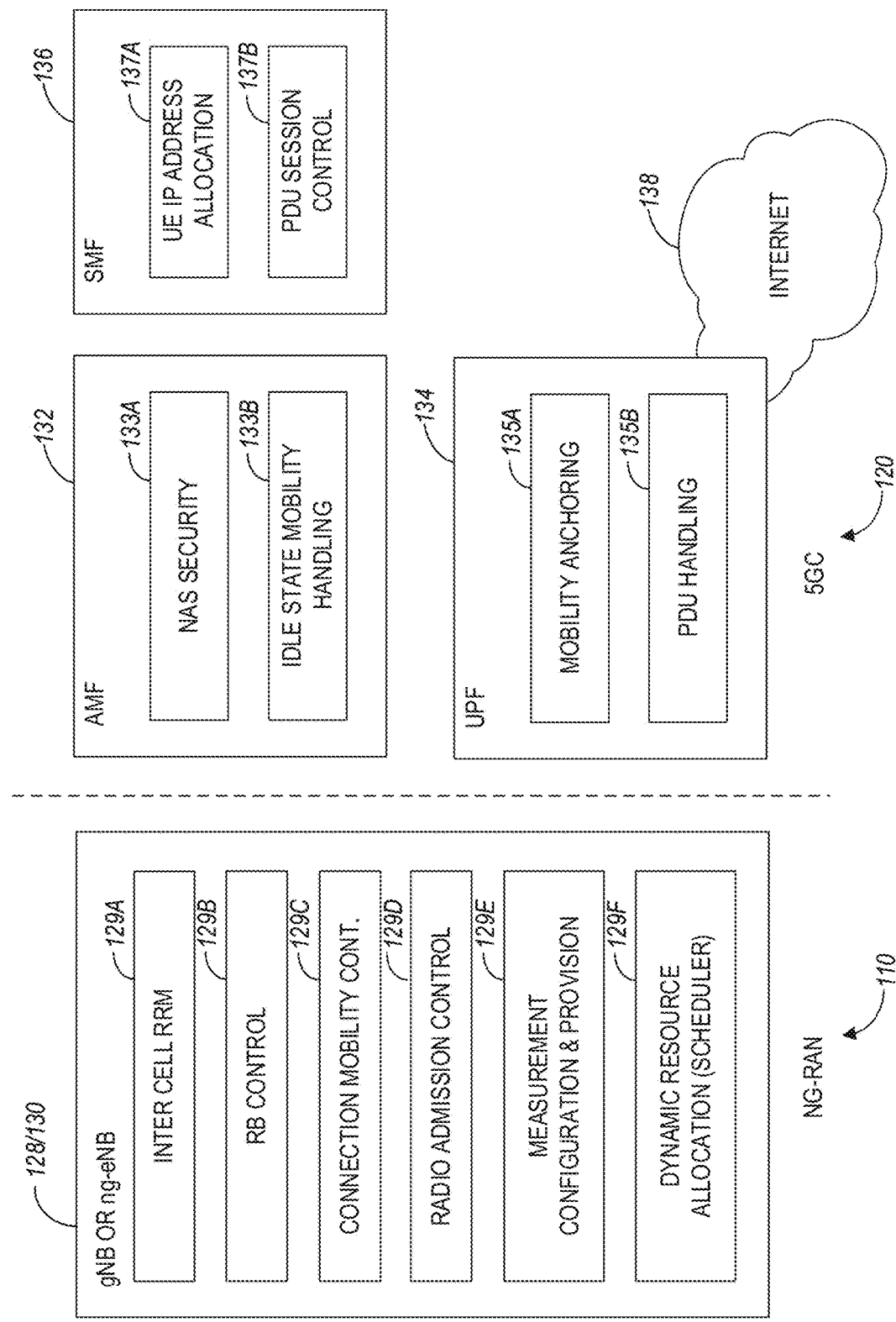
FIG. 1C illustrates a functional split between next generation radio access network (NG-RAN) and the 5G Core network (5GC), in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
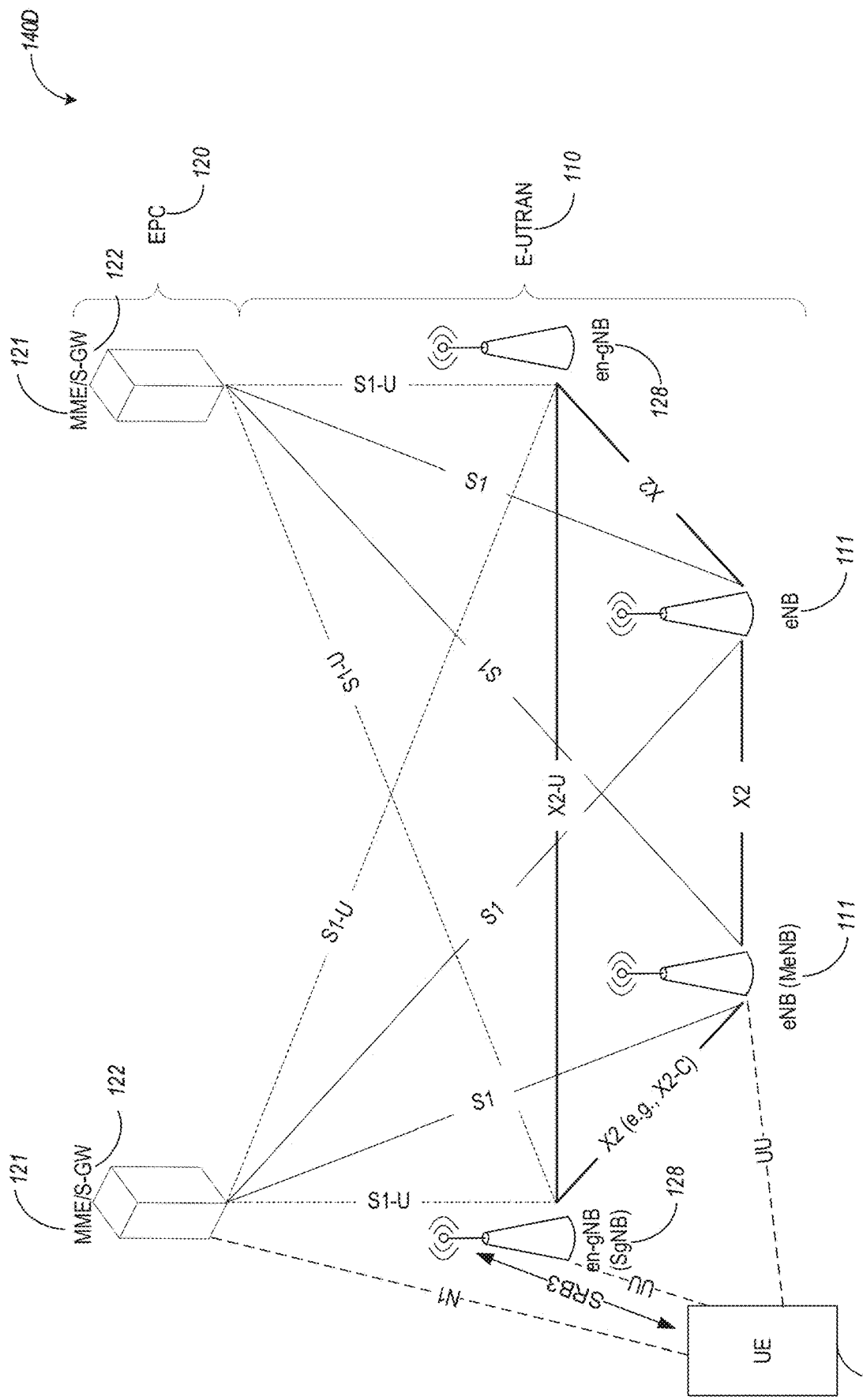
FIG. 1D illustrates an example Evolved Universal Terrestrial Radio Access (E-UTRA) New Radio Dual Connectivity (EN-DC) architecture, in accordance with some aspects.

FIG. 1D illustrates an example Evolved Universal Terrestrial Radio Access (E-UTRA) New Radio Dual Connectivity (EN-DC) architecture, in accordance with some aspects. Referring to FIG. 1D, the EN-DC architecture 140D includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the to eNBs 111 are connected to the EPC 120 via the S1 interface and to the EN-gNBs 128 via the X2 interface. The EN-gNBs (or SgNBs) 128 may be connected to the EPC 120 via the S1-U interface, and to other EN-gNBs via the X2-U interface. The SgNB 128 can communicate with the UE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some aspects, the MeNB 111 can be connected to the MME 121 via S1-MME interface and to the SgNB 128 via an X2-C interface. In some aspects, the MeNB 111 can be connected to the SGW 122 via S1-U interface and to the SgNB 128 via an X2-U interface. In some aspects associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer.

There is growing interest in utilizing cellular networks to provide communications for emerging drone applications. However, cellular networks were developed to serve user equipment (UE) on the ground and hence there are multiple challenges to support drone communications via cellular links. For example, the path loss for ground-to-air channel decays slower than a ground-to-ground channel. Thus, drones can experience severe co-channel interference from multiple neighbor cells. It is possible that there are certain regions in the air where the signal quality (e.g., signal-to-interference-plus-noise ratio or SINR) is very low to maintain a control channel connection causing radio link failure (RLF). In addition, base station (BS) antennas are typically tilted downwards for better ground coverage. Due to the fact that drones are supported by the side lobes of the BS antennas, BS-drone link qualities can fluctuate from side lobe to side lobe as drones travel in the sky. Depending on its speed, the drone may encounter ping-pong issues in handover (HO), i.e. HO back and forth with the same BS. Without carefully considering the anticipated cell quality fluctuation, an unnecessary HO procedure may be triggered. This is also true when a drone does fast maneuvers like flipping/rotation with directional antenna patterns. In most instances, the handover failure rate increases with drone speed and altitude. As maintaining a reliable command and control channel is essential for drone operation, it is of critical importance to improve the handover performance for drones.

Techniques disclosed herein can use characteristics of drone communication channels for enhancing HO support of drones. In this regard, both BS/network-initiated and UE-initiated enhancement procedures are disclosed herein, with proposed new signaling that can be useful for handover support for drones. More specifically, two kinds of drone handover enhancement approaches are disclosed hereinbelow: (a) Base station/network-initiated mobility enhancements; and (b) UE-initiated specific mobility enhancement. For both enhancements, new handover algorithms are designed addressing special drone channel properties, and new signaling can be used to cope with the mobility management for drones.

Drone Special Channel Properties

Figure 2:
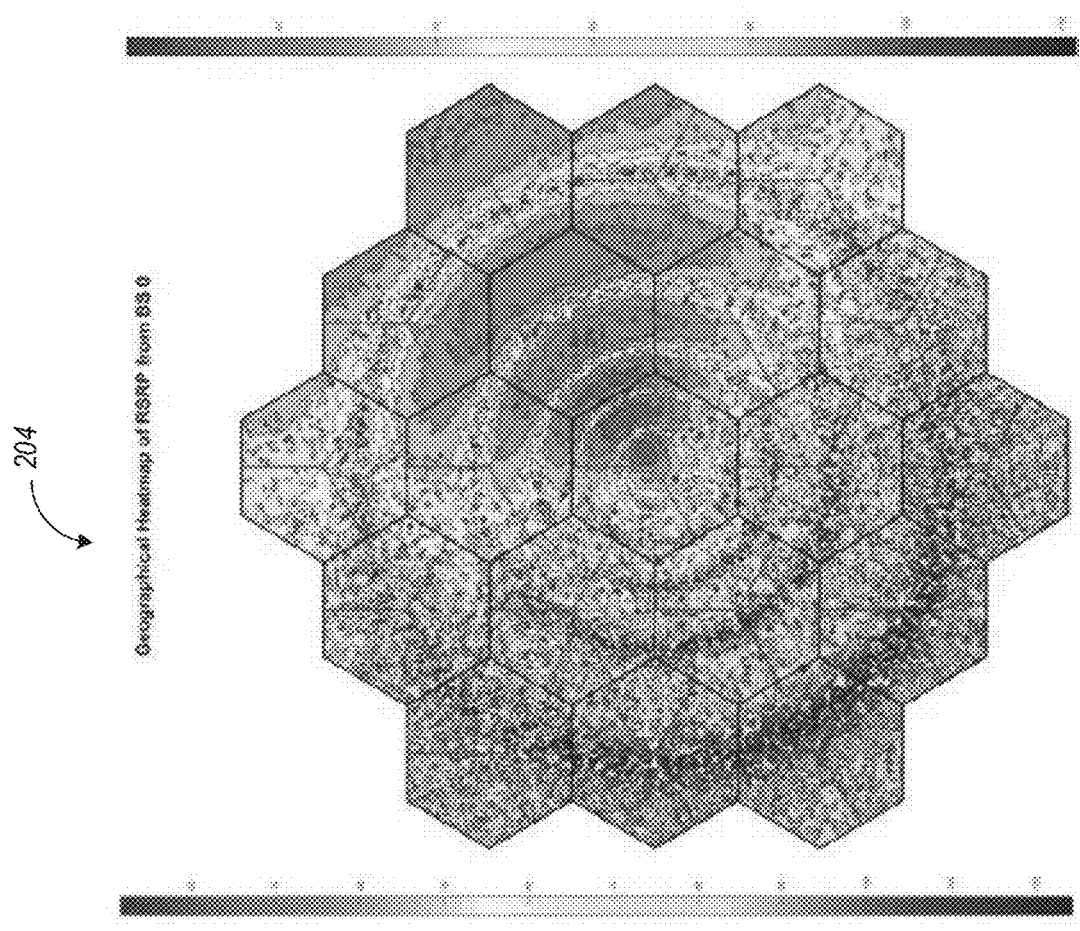
FIG. 2 illustrates a geographical heat map of UE reference signal received power (RSRP) from a $1^{st}$ sector (boresight pointing 30° towards upper right) of a central base station (BS) site for UEs at 0 m and 300 m altitudes.
Figure 2:
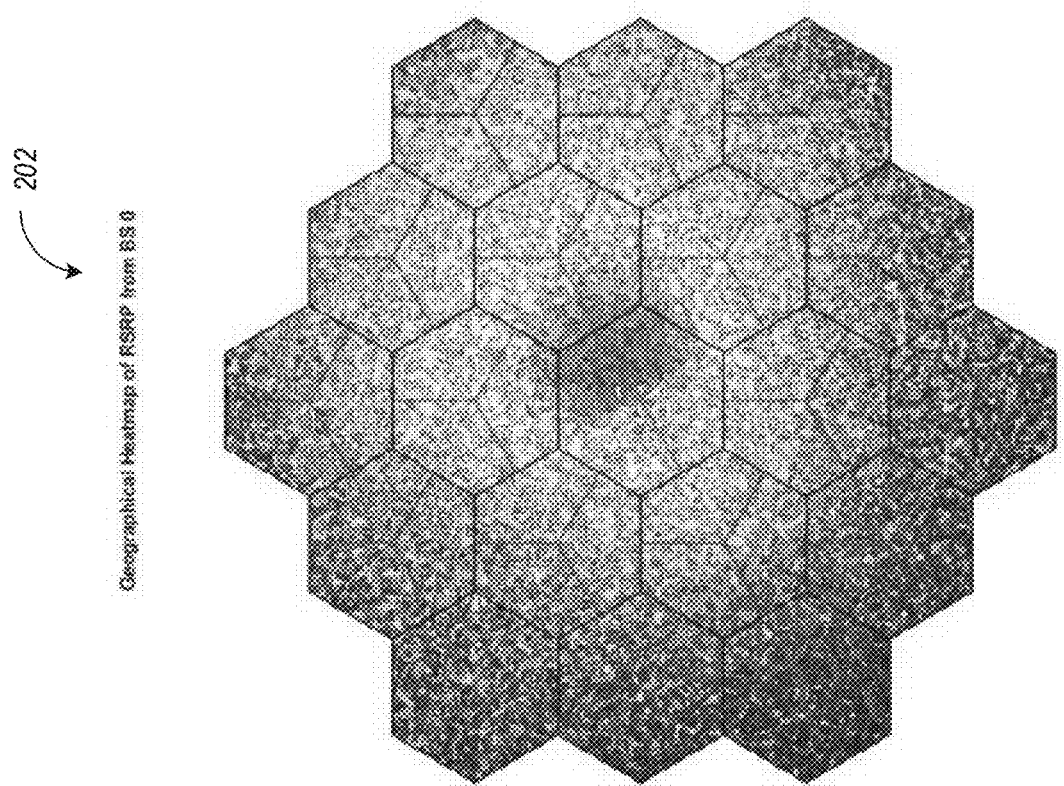

Although the channel environment for drones is more hostile, it is more predictable as there are fewer objects in the sky. Therefore, there are more opportunities to take advantage of these predictable features. FIG. 2 illustrates a geographical heat map of UE reference signal received power (RSRP) from a $1^{st}$ sector (boresight pointing 30° towards upper right) of a central base station (BS) site for UEs at 0 m and 300 m altitudes. We can observe that, for aerial UEs (at 300 m height illustrated at graph 204), signal attenuates slower as the distance to BS increases than ground UEs (at 0 m illustrated at graph 202), i.e., a BS can cause strong interference to UEs located in neighboring cells that are one or two tiers beyond. In addition, there can be drops in signal level due to elevation null from BS antenna pattern. Failure to timely detect the sudden signal drop can result in handover failure or RLF. On the other hand, since the signals may quickly recover once the UE travels back to regions with good signal quality, there can be unnecessary HO being triggered. The frequent transition between high and low signal strength can translate to more cell boundaries a UE observes while moving around. Therefore, aerial UEs (or drones) can experience more frequent handovers than ground UEs and may suffer from ping-pong effect.

Nevertheless, we can observe clear signal strength variation pattern from FIG. 2 for aerial UEs. This implies that we can make use of extra information, such as UE geolocation, speed, and travel direction, to predict the corresponding channel response and enhance the handover procedure for drones. In the following paragraphs, there is provided additional information regarding techniques for enhancing handover for drones.

Base Station/Network—Initiated Mobility Enhancement: Algorithm:

In some aspects, a cell can maintain 3-dimensional signal environment properties in a database (e.g., database 194A), which records the quality of the signal in the air. The database can be based on, e.g., past UE measurements, or antenna specifications for identifying elevation nulls.

In some aspects, for each region in the air, the BSs (e.g., eNB 111) can characterize each of location, speed, and/or direction into different categories such as normal and fast-fluctuation. The BS can further divide the aerial region into several categories based on what functionalities are typical for the region, e.g., normal, fast-fluctuation, ping-pong, dead zone. For different zones, different enhancement procedures can be adopted which can include one or more of the following:

In fast-fluctuation zones, the handover parameters can be set with a scaling factor to match the anticipated cell quality change rate. Time to trigger (TTT) can be based on speed and/or elevation and/or direction from the base station. Timer T310 (which is related to RLF) can be based on speed and/or elevation and/or direction from the base station. In ping-pong zones, the serving cell can instruct the drone to increase the A3 bias, to neglect measurements from a specific set of neighbor cells, or to temporally deactivate a typical reporting mechanism based on measurements. In some aspects, before the drone enters a 'dead zone', the serving cell can alert the drone to prepare for handover. The BS can also inform the drone of dead zones such that the drone can avoid traveling in such areas.

In some aspects, when a serving cell knows the drone's route, the serving cell can prepare the drone's handover by sending a 'suggested HO list'—a list of cells the drone can consider connecting with priority. Such list can be generated by the serving cell based on route information or flight path information, current height, current travel direction and speed, and/or future route and speed as can be reported to the serving cell by the drone. One possible enhancement is that once any cell within the list is beyond a minimal threshold, the drone can promptly report with a modified TTT. In addition, if route information for longer time duration is available, the serving cell may signal in advance to instruct the drone UE how the TTT can be adjusted along its trajectory.

In some aspects, the serving cell may prioritize the HO transition before what is needed in a traditional procedure as it can estimate in real-time the time needed for the HO to happen.

In some aspects, dual connectivity between the drone, the source eNB, and the target eNB may be enabled as well in a fast fluctuation region for stability.

In some aspects, once the serving cell receives the measurement report from the UE, the serving cell may send an HO request to multiple target cells, the serving cell may combine multiple target cells HO ACK into a single HO command, and forward such HO command to the UE. The drone UE may select one target cell based on signal quality at the time of receiving the HO command. Once the UE handover to the selected target cell is completed, the target cell can signal the serving cell that the HO is completed. The serving cell can then signal the other unused target cells to release the resources.

In some aspects, the route information may be included in the measurement report (MR) or RRC connection setup message, or other RRC messaging. In some aspects, the route information may contain the current location and final destination. In some aspects, the route information may contain multiple points of the path of flying. In some aspects, the route information may be forward to the target cell upon handover. The network may use this information to prepare the target cell sooner and configure corresponding measurement events. As soon as the measurement report (MR) is received by the serving cell, the serving cell can forward the HO command to the UE without waiting for X2 delay of the HO request and acknowledgment (ACK). In some aspects, the network may also prepare the target cell along the flying path and send HO command in advance to the UE without measurement report. The advance HO command may contain an HO trigger condition where the UE will not execute the HO immediately but rather when the condition is met, then the UE can perform the HO to the target cell.

Signaling

In some aspects, an information message can be sent from the drone UE to the serving cell. More specifically, a drone can periodically (or upon request) include in the measurement report the following information:

Current height: For example, the height information may be encoded in 1-2 bits mapping to predefined height. One example is the vertical height can be divided into several regions such as below 40 m, 40-60, 60-80, 80-100, 100-120, and above 120 m. The request message may also contain a request to the UE when a change of height, the drone UE to report the elevation. In some aspects, a new measurement report may also be introduced with height evaluation triggering as a condition. For example, it is X meters higher than the last reporting, or it reaches Y meters as an absolute value. In some aspects, one or more height threshold values can be communicated to the UE during the measurement control configuration. The UE can then trigger reporting its aerial height (or altitude) when such height is above a first threshold or below a second threshold.

Current travel direction and speed: in some aspects, the measurement reports may contain the heading direction and speed of the drone. In some aspects, a threshold can be set to trigger this report. For example, a drone can only inform a BS the travel direction and speed information if the travel direction and/or speed will remain unchanged for more than T0 second, or over a distance more than S0 meters, where both T0 and S0 are threshold values set by the serving cell. In some aspects, a drone can further report its future route and speed to its serving cell, if such information is available.

Figure 3:
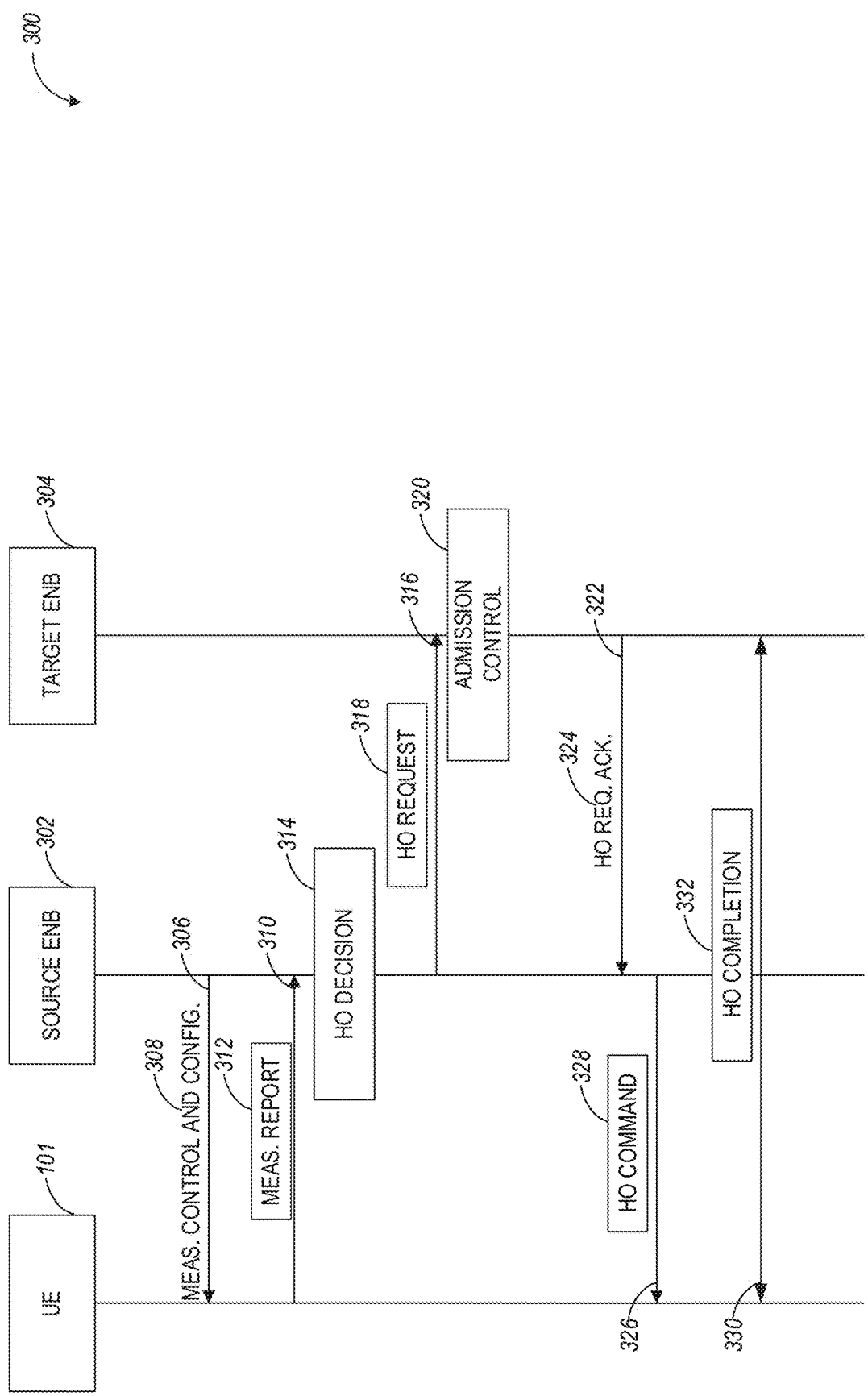
FIG. 3 illustrates a communication flow diagram for handover using measurement reporting with enhanced signaling design for drones in a cellular network, in accordance with some aspects.

FIG. 3 illustrates a communication flow diagram 300 for handover using measurement reporting with enhanced signaling design for drones in a cellular network, in accordance with some aspects. Referring to FIG. 3, the communication flow illustrated in diagram 300 can take place in connection with a handover procedure between a drone UE 101, a source eNB 302, and a target eNB 304. At operation 306, measurement control and configuration signaling 308 (or 190A in FIG. 1A) can be communicated from the source eNB 302 to the drone UE 101. The configuration signaling 308 can include, for example, one or more thresholds for triggering drone height or altitude measurements for inclusion in a measurement report. At operation 310, the measurement report 312 can be generated based on the configuration information 308.

At operation 314, the source eNB 302 can perform a handover decision 314 based on the received measurement report 312. At operation 316, the source eNB 302 communicates a handover request 318 to the target eNB 304, passing necessary information to prepare the HO at the target side (UE X2 signalling context reference at source eNB, UE S1 EPC signalling context reference, target cell ID, KeNB*, RRC context including the C-RNTI of the UE in the source eNB, AS-configuration, E-RAB context and physical layer ID of the source cell, and short MAC-I for possible RLF recovery). UE X2/UE S1 signaling references enable the target eNB to address the source eNB and the EPC. The E-RAB context includes necessary RNL and TNL addressing information, and QoS profiles of the E-RABs.

At operation 320, admission control may be performed by the target eNB 304 dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

At operation 322, the target eNB 304 communicates a handover request acknowledgment 324 to the source eNB 302. At operation 326, the source eNB 302 communicates a handover command 328 to the drone UE 101. More specifically, the target eNB 304 can generate the RRC message to perform the handover, i.e. RRCConnectionReconfiguration message including the mobilityControlInformation, to be sent by the source eNB 302 towards the drone UE 101. The source eNB 302 performs the necessary integrity protection and ciphering of the message.

The drone UE 101 receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB 302 to perform the HO. If RACH-less HO is configured, the RRCConnectionReconfiguration includes timing adjustment indication and optionally preallocated uplink grant for accessing the target eNB. If the preallocated uplink grant is not included, the UE should monitor PDCCH of the target eNB to receive an uplink grant. The UE does not need to delay the handover execution for delivering the HARQ/ARQ responses to source eNB.

At operation 330, handover completion 332 can take place and can include multiple operations such as synchronization, uplink allocation, RRC connection reconfiguration completion report, and so forth in order to complete their handover to the target eNB 304.

Figure 4:
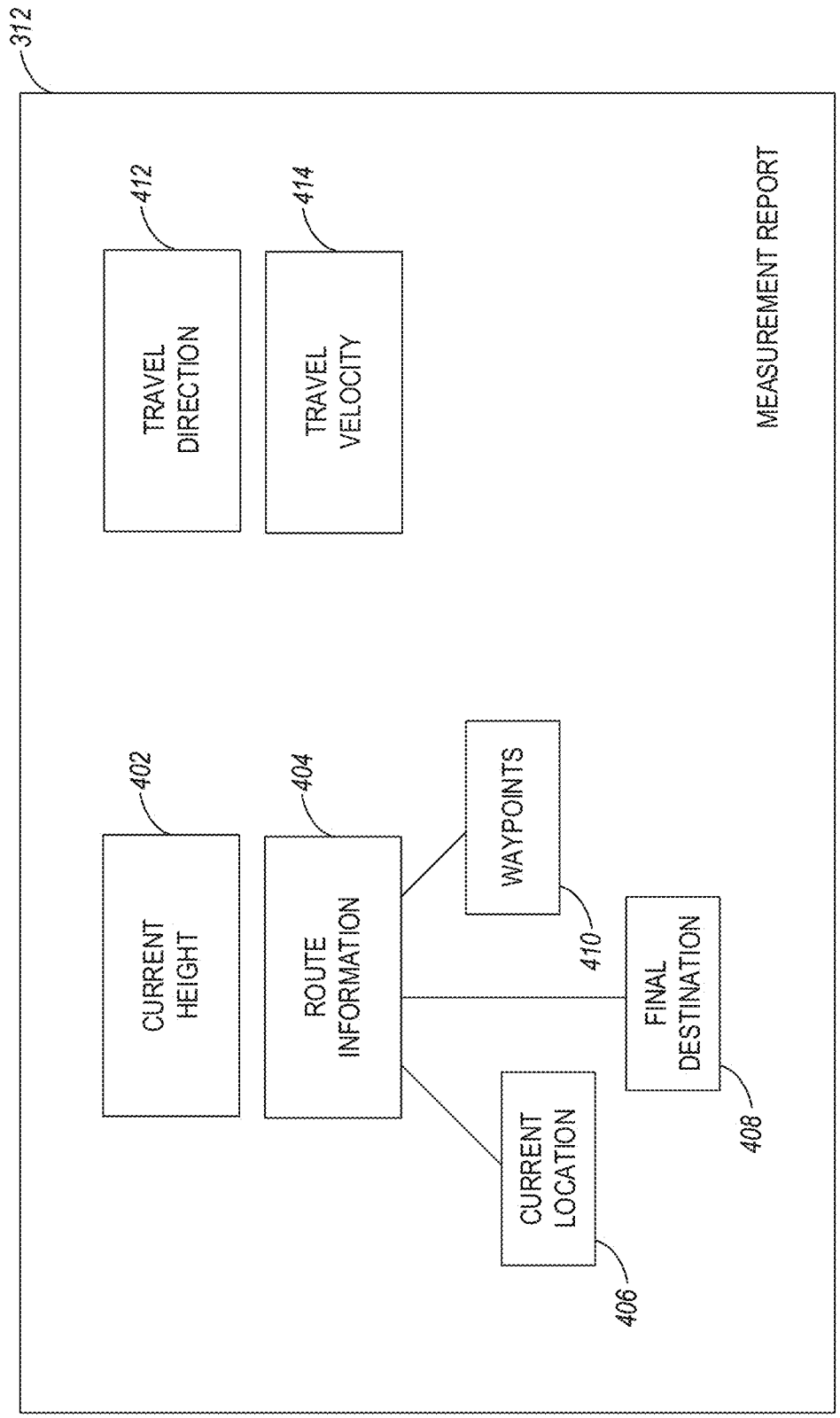
FIG. 4 illustrates a block diagram of an example measurement report that can be configured using enhanced signaling design for drones, in accordance with some aspects.

FIG. 4 illustrates a block diagram of an example measurement report that can be configured using enhanced signaling design for drones, in accordance with some aspects. Referring to FIG. 4, there is illustrated a more detailed view of the measurement report 312 generated during the drone handover process described in FIG. 3. More specifically, the measurement report 312 can include the following information associated with the drone UE 101: current height information (or altitude) 402, route or flight path information 404, travel/flight direction information 412, and travel velocity information 414. The route information 404 can further include a current location information 406, a final destination location 408, as well as one or more waypoints or intermediate locations 410 along the route from the current location to the final destination. Other drone-related information can also be included in the measurement report 312, which information can be used to facilitate handover between cells.

UE-Initiated Mobility Enhancements

In some aspects, the drone UE can collect geographical and BS information from higher layers, such as application servers, and utilize such information to enhance handover. Information gathered from higher layers can include 3-dimensional geographical coverage holes, BS locations and elevation nulling angles, and so forth. Based on the collected information, the drone UE can perform various handover enhancements.

In some aspects, the drone UE can deter mine locally whether to shorten or increase TTT for handover measurement based on its location and height estimate. Furthermore, the drone UE can independently determine the measurement granularity. For example, based on the database (e.g., 194A), the drone UE can obtain measurement more frequently from certain candidate cells. Also, the drone UE can measure the links between certain "good" (or "optimal") cells identified as such in the database.

In some aspects, the drone UE can predict whether it is currently in a coverage hole (or a dead zone) based on its own geolocation, angle direction, and past channel quality measurement, as well as a database containing BS information. Once the drone UE detects that it is in a dead zone, it can navigate away from the dead zone. Also, the drone can inform the BS of a potential handover attempt.

In some aspects, the drone UE 101 can utilize higher-layer information to obtain a signal region map from an application layer or a network layer, and locally store and update the database (e.g., 194A).

Figure 5:
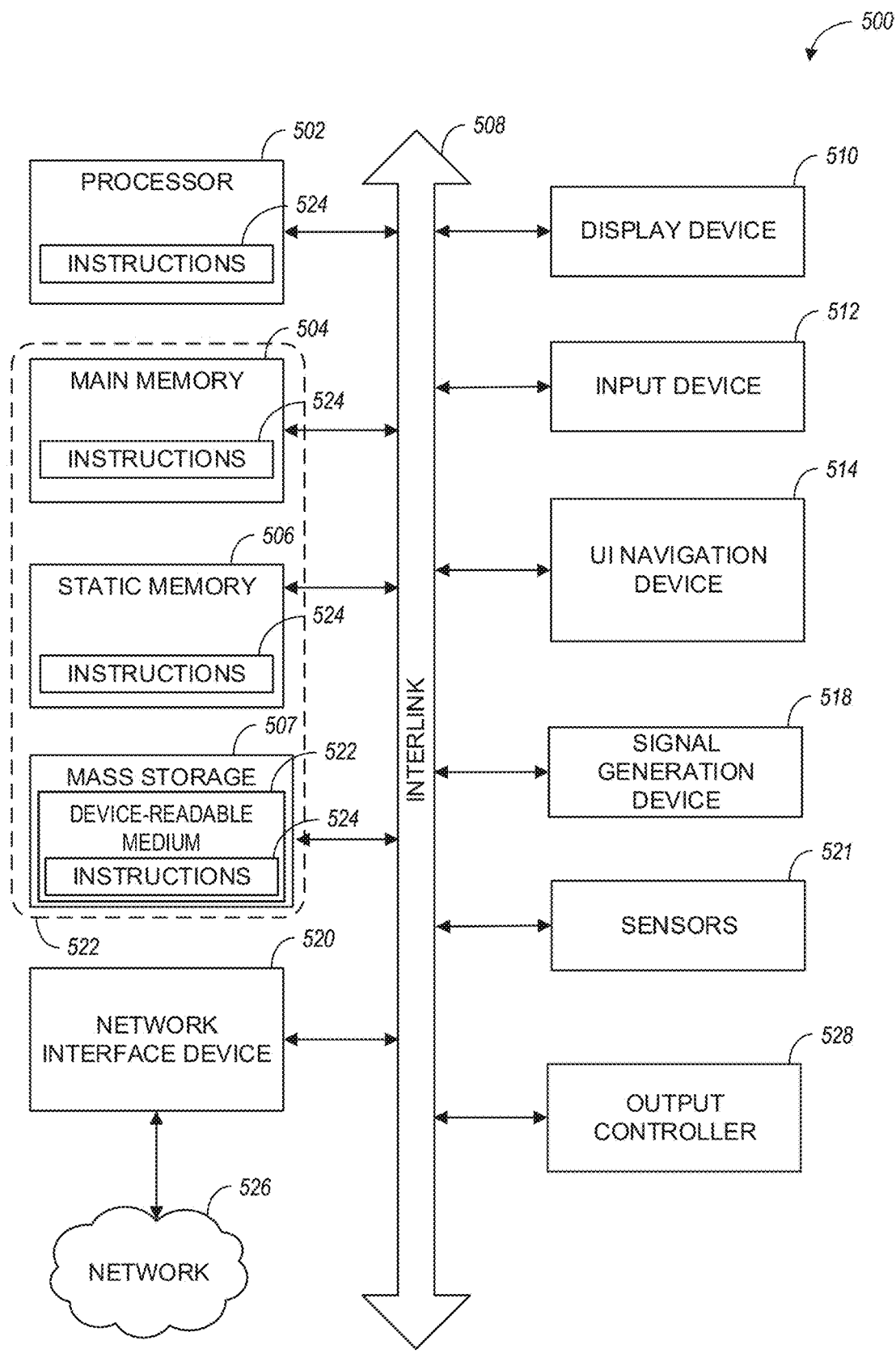
FIG. 5 illustrates a block diagram of a communication device such as an evolved Node-B (eNB), a new generation Node-B (gNB), an access point (AP), a wireless station (STA), a mobile station (MS), or a user equipment (UE) such as a drone, in accordance with some aspects.

FIG. 5 illustrates a block diagram of a communication device such as an evolved Node-B (eNB), a new generation Node-B (gNB), an access point (AP), a wireless station (STA), a mobile station (MS), or a user equipment (UE) such as a drone, in accordance with some aspects and to perform one or more of the techniques disclosed herein. In alternative aspects, communication device 500 may operate as a standalone device or may be connected (e.g., networked) to other communication devices.

Circuitry (e.g., processing circuitry) is a collection of circuits implemented intangible entities of the device 500 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 500 follow.

In some aspects, device 500 may operate as a standalone device or may be connected (e.g., networked) to other devices. In a networked deployment, the communication device 500 may operate in the capacity of a server communication device, a client communication device, or both in server-client network environments. In an example, the communication device 500 may act as a peer communication device in peer-to-peer (P2P) (or other distributed) network environment. The communication device 500 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 500 may include a hardware processor 502 (e.g., a central processing unit (CPU), a graphics processing unit (GPU), a hardware processor core, or any combination thereof), a main memory 504, a static memory 506, and mass storage 507 (e.g., hard drive, tape drive, flash storage, or other block or storage devices), some or all of which may communicate with each other via an interlink (e.g., bus) 508.

The communication device 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touchscreen display. The communication device 500 may additionally include a signal generation device 518 (e.g., a speaker), a network interface device 520, and one or more sensors 521, such as a global positioning system (GPS) sensor, compass, accelerometer, or another sensor. The communication device 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 507 may include a communication device-readable medium 522, on which is stored one or more sets of data structures or instructions 524 (e.g., software) embodying or utilized by any one or more of the techniques or functions described herein. In some aspects, registers of the processor 502, the main memory 504, the static memory 506, and/or the mass storage 507 may be, or include (completely or at least partially), the device-readable medium 522, on which is stored the one or more sets of data structures or instructions 524, embodying or utilized by any one or more of the techniques or functions described herein. In an example, one or any combination of the hardware processor 502, the main memory 504, the static memory 506, or the mass storage 516 may constitute the device-readable medium 522.

As used herein, the term "device-readable medium" is interchangeable with "computer-readable medium" or "machine-readable medium". While the communication device-readable medium 522 is illustrated as a single medium, the term "communication device-readable medium" may include a single medium or multiple media (e.g., a centralized or distributed database, and/or associated caches and servers) configured to store the one or more instructions 524.

The term "communication device-readable medium" is inclusive of the terms "machine-readable medium" or "computer-readable medium", and may include any medium that is capable of storing, encoding, or carrying instructions (e.g., instructions 524) for execution by the communication device 500 and that cause the communication device 500 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 524 may further be transmitted or received over a communications network 526 using a transmission medium via the network interface device 520 utilizing any one of a number of transfer protocols. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input-multiple-output (SIMO), MIMO, or multiple-input-single-output (MISO) techniques. In some examples, the network interface device 520 may wirelessly communicate using Multiple User MIMO techniques.

The term "transmission medium" shall be taken to include any intangible medium that is capable of storing, encoding or carrying instructions for execution by the communication device 500, and includes digital or analog communications signals or another intangible medium to facilitate communication of such software. In this regard, a transmission medium in the context of this disclosure is a device-readable medium.

A communication device-readable medium may be provided by a storage device or other apparatus which is capable of hosting data in a non-transitory format. In an example, information stored or otherwise provided on a communication device-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the communication device-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus to be used in an aerial user equipment (UE), the apparatus comprising:
processing circuitry, wherein to configure the UE for handover between a source evolved Node-B (eNB) and a target eNB using aerial communications in a cellular network, the processing circuitry is to:
decode first radio resource control (RRC) signaling from the source eNB, the first RRC signaling including measurement configuration information specifying a height threshold associated with aerial height of the aerial UE;
encode a measurement report for transmission to the source eNB, the measurement report including the aerial height of the aerial UE and the measurement report generation triggered based on a triggering event associated with the height threshold;
decode second RRC signaling from the source eNB, the second RRC signaling including a handover command, the handover command based on a handover decision by the source eNB using the measurement report; and
perform a handover from the source eNB to the target eNB based on the handover command; and
memory coupled to the processing circuitry, the memory configured to store the measurement configuration information.

2. The apparatus of claim 1, wherein the processing circuitry is configured to:
decode third RRC signaling, the third RRC signaling indicating a first offset and a second offset for the height threshold,
wherein the height threshold adjusted by the first offset is associated with a first measurement report event, the first measurement report event triggering the generation of the measurement report when the aerial height of the aerial UE is above the height threshold adjusted by the first offset.

3. The apparatus of claim 2, wherein the height threshold adjusted by the second offset is associated with a second measurement report event, the second measurement report event triggering the generation of the measurement report when the aerial height of the aerial UE is below the height threshold adjusted by the second offset.

4. The apparatus of claim 1, wherein the processing circuitry is to:
encode UE capability configuration information for transmission to the source eNB, the UE capability configuration information indicating whether the aerial UE supports measurement events triggering generation of the measurement report based on the aerial height of the aerial UE.

5. The apparatus of claim 1, wherein the processing circuitry is to:
encode the measurement report to further include an information element indicating vertical velocity of the aerial UE.

6. The apparatus of claim 1, wherein the processing circuitry is further to:
decode an information request from the source eNB;
based on the information request, encode an information response for transmission to the source eNB, the information response including flight path information for the aerial UE.

7. The apparatus of claim 6, wherein the flight path information includes a list of waypoints along the flight path of the aerial UE.

8. The apparatus of claim 1, wherein the processing circuitry is to:
encode UE capability configuration information for transmission to the source eNB, the UE capability configuration information indicating whether the aerial UE supports reporting of flight path information for inclusion in the measurement report.

9. The apparatus of claim 1, wherein the processing circuitry is to:
determine flight path information for the aerial UE;
retrieve 3-dimensional signal environment properties based on the determined flight path; and
determine whether to perform the handover from the source eNB to the target eNB based on the signal environment properties along the flight path and within a cell of the target base station.

10. The apparatus of claim 1, further comprising transceiver circuitry coupled to the processing circuitry; and, one or more antennas coupled to the transceiver circuitry.

11. A non-transitory computer-readable storage medium that stores instructions for execution by one or more processors of a source base station configured for aerial communications in a cellular network, the instructions to configure the one or more processors to cause the source base station to:
encode first radio resource control (RRC) signaling for transmission to an aerial user equipment (UE), the first RRC signaling including measurement configuration information specifying a height threshold associated with aerial height of the aerial UE;
decode a measurement report received from the aerial UE, the measurement report including the aerial height of the aerial UE and the measurement report generation triggered based on a triggering event associated with the height threshold; and
encode second RRC signaling for transmission to the aerial UE, the second RRC signaling including a handover command for handover from the source base station to a target base station, the handover command based on a handover decision by the source eNB using the measurement report.

12. The non-transitory computer-readable storage medium of claim 11, wherein instructions configure the one or more processors to cause the source base station to:
encode third RRC signaling, the third RRC signaling indicating a first offset and a second offset for the height threshold, wherein the height threshold adjusted by the first offset is associated with a first measurement report event, the first measurement report event triggering the generation of the measurement report when the aerial height of the aerial UE is above the height threshold adjusted by the first offset.

13. The non-transitory computer-readable storage medium of claim 12, wherein the height threshold adjusted by the second offset is associated with a second measurement report event, the second measurement report event triggering the generation of the measurement report when the aerial height of the aerial UE is below the height threshold adjusted by the second offset.

14. The non-transitory computer-readable storage medium of claim 11, wherein instructions configure the one or more processors to cause the source base station to:
   decode UE capability configuration information received from the aerial UE, the UE capability configuration information indicating whether the aerial UE supports measurement events triggering generation of the measurement report based on the aerial height of the aerial UE.

15. The non-transitory computer-readable storage medium of claim 11, wherein instructions configure the one or more processors to cause the source base station to:
   encode an information request for transmission to the aerial UE;
   decode an information response received from the aerial UE, the information response based on the information request and including flight path information for the aerial UE.

16. A non-transitory computer-readable storage medium that stores instructions for execution by one or more processors of an aerial user equipment (UE) configured for aerial communications in a cellular network, the instructions to configure the one or more processors to cause the UE to:
   decode first radio resource control (RRC) signaling from the source eNB, the first RRC signaling including measurement configuration information specifying a height threshold associated with aerial height of the aerial UE;
   encode a measurement report for transmission to the source eNB, the measurement report including the aerial height of the aerial UE and the measurement report generation triggered based on a triggering event associated with the height threshold;
   decode second RRC signaling from the source eNB, the second RRC signaling including a handover command, the handover command based on a handover decision by the source eNB using the measurement report; and
   perform a handover from the source eNB to the target eNB based on the handover command.

17. The non-transitory computer-readable storage medium of claim 16, wherein the instructions further configure the one or more processors to cause the aerial UE to:
   decode third RRC signaling, the third RRC signaling indicating a first offset and a second offset for the height threshold,
   wherein the height threshold adjusted by the first offset is associated with a first measurement report event, the first measurement report event triggering the generation of the measurement report when the aerial height of the aerial UE is above the height threshold adjusted by the first offset.

18. The non-transitory computer-readable storage medium of claim 17, wherein the height threshold adjusted by the second offset is associated with a second measurement report event, the second measurement report event triggering the generation of the measurement report when the aerial height of the aerial UE is below the height threshold adjusted by the second offset.

19. The non-transitory computer-readable storage medium of claim 16, wherein the instructions further configure the one or more processors to cause the aerial UE to:
   encode UE capability configuration information for transmission to the source eNB, the UE capability configuration information indicating whether the aerial UE supports measurement events triggering generation of the measurement report based on the aerial height of the aerial UE.

20. The non-transitory computer-readable storage medium of claim 16, wherein the instructions further configure the one or more processors to cause the aerial UE to:
   encode the measurement report to further include an information element indicating vertical velocity of the aerial UE.

* * * * *

UNITED STATES PATENT AND TRADEMARK OFFICE
CERTIFICATE OF CORRECTION

PATENT NO. : 11,388,638 B2
APPLICATION NO. : 16/406781
DATED : July 12, 2022
INVENTOR(S) : Yeh et al.

Page 1 of 1

It is certified that error appears in the above-identified patent and that said Letters Patent is hereby corrected as shown below:

On the Title Page

Item (57), in Column 2, Line 1, delete "UT" and insert --UE-- therefor

Signed and Sealed this
Twenty-eighth Day of February, 2023

*Katherine Kelly Vidal*

Katherine Kelly Vidal
*Director of the United States Patent and Trademark Office*